(12) United States Patent
Otto et al.

(10) Patent No.: US 10,267,176 B2
(45) Date of Patent: Apr. 23, 2019

(54) ADJUSTABLE FLANGE MATERIAL AND TORQUE PATH ISOLATION FOR SPLINED FAN DRIVE GEAR SYSTEM FLEXIBLE SUPPORT

(71) Applicant: United Technologies Corporation, Hartford, CT (US)

(72) Inventors: John R. Otto, Middletown, CT (US); Sunil Sharma, Rocky Hill, CT (US)

(73) Assignee: United Technolgies Corporation, Farmington, CT (US)

( * ) Notice: Subject to any disclaimer, the term of this patent is extended or adjusted under 35 U.S.C. 154(b) by 626 days.

(21) Appl. No.: 14/902,023

(22) PCT Filed: Jul. 3, 2014

(86) PCT No.: PCT/US2014/045341
§ 371 (c)(1),
(2) Date: Dec. 30, 2015

(87) PCT Pub. No.: WO2015/006149
PCT Pub. Date: Jan. 15, 2015

(65) Prior Publication Data
US 2016/0369648 A1 Dec. 22, 2016

Related U.S. Application Data

(60) Provisional application No. 61/843,418, filed on Jul. 7, 2013.

(51) Int. Cl.
*F01D 15/12* (2006.01)
*F01D 25/16* (2006.01)
(Continued)

(52) U.S. Cl.
CPC ............ *F01D 15/12* (2013.01); *F01D 25/164* (2013.01); *F01D 25/24* (2013.01); *F01D 25/28* (2013.01);
(Continued)

(58) Field of Classification Search
CPC ........ F01D 15/12; F01D 25/164; F01D 25/24; F01D 25/28; F02C 7/20; F02C 7/36;
(Continued)

(56) References Cited

U.S. PATENT DOCUMENTS 5,022,816 A * 6/1991 Maier .................... F01D 11/08
415/115
5,433,674 A * 7/1995 Sheridan ............... F16H 1/2809
475/346
(Continued)

FOREIGN PATENT DOCUMENTS

EP 2339146 A1 6/2011
EP 2584153 A2 4/2013

OTHER PUBLICATIONS

European Search Report for EP Application No. 14823381.0 dated Jul. 5, 2016.
(Continued)

*Primary Examiner* — Jason D Shanske
*Assistant Examiner* — Joshua R Beebe
(74) *Attorney, Agent, or Firm* — Carlson, Gaskey & Olds, P.C.

(57) ABSTRACT

A gear assembly support for a gas turbine engine includes a first portion engageable to a case of the gas turbine engine and a second portion configured for supporting a gear assembly. The support includes a torque reacting portion for transferring torque from the second portion to the first portion, a forward flange disposed forward of the torque reacting portion, the forward flange defining a first interface (Continued)

to the case and an aft flange disposed aft of the torque reacting portion, the aft flange defining a second interface to the case.

19 Claims, 4 Drawing Sheets

(51) Int. Cl.
*F02C 7/20* (2006.01)
*F01D 25/24* (2006.01)
*F01D 25/28* (2006.01)
*F04D 25/04* (2006.01)
*F04D 29/053* (2006.01)
*F04D 29/32* (2006.01)
*F02C 7/36* (2006.01)

(52) U.S. Cl.
CPC .............. *F02C 7/20* (2013.01); *F04D 25/045* (2013.01); *F04D 29/053* (2013.01); *F04D 29/325* (2013.01); *F02C 7/36* (2013.01); *F05D 2220/323* (2013.01); *F05D 2230/60* (2013.01); *Y02T 50/671* (2013.01)

(58) Field of Classification Search
CPC .... F04D 25/045; F04D 25/053; F04D 25/325; F04D 29/053; F04D 29/325; F05D 2220/3223; F05D 2230/60; F05D 2220/323; Y02T 50/671
See application file for complete search history.

(56) References Cited

U.S. PATENT DOCUMENTS

| 7,736,083 | B2* | 6/2010 | Lescure | F01D 5/026 403/359.1 |
| 7,955,046 | B2 | 6/2011 | McCune et al. | |
| 8,297,916 | B1 | 10/2012 | McCune et al. | |
| 8,297,917 | B1 | 10/2012 | McCune et al. | |
| 8,333,678 | B2 | 12/2012 | McCune | |
| 2007/0225111 | A1* | 9/2007 | Duong | F16D 3/72 475/331 |
| 2010/0105516 | A1* | 4/2010 | Sheridan | F01D 25/18 475/346 |
| 2011/0130246 | A1 | 6/2011 | McCune et al. | |
| 2011/0286836 | A1 | 11/2011 | Davis | |
| 2012/0213628 | A1 | 8/2012 | McCune et al. | |

OTHER PUBLICATIONS

U.S. Appl. No. 13/653,548 entitled "Fan Drive Gear System Flexible Support Features".
International Search Report and Written Opinion for International Application No. PCT/US2014/045341 dated Dec. 12, 2014.
International Preliminary Report on Patentability for International Application No. PCT/US2014/045341 dated Jan. 21, 2016.

* cited by examiner

ADJUSTABLE FLANGE MATERIAL AND TORQUE PATH ISOLATION FOR SPLINED FAN DRIVE GEAR SYSTEM FLEXIBLE SUPPORT

REFERENCE TO RELATED APPLICATION

This application claims priority to U.S. Provisional Application No. 61/843,418 filed on Jul. 7, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly is attached to a static structure through a flexible support. The flexible support orientates the gear assembly within the engine and also accommodates generated torque during operation. The support function includes a desired fit with static structure and is balanced against the torque transfer function. The configuration of the flexible support is therefore balanced against the desire to reduce cost and weight along with the separate functions. Accordingly, engine manufacturers continue to seek improvements in the support structure that balance the functional requirements against cost and weight.

SUMMARY

A gear assembly support for a gas turbine engine according to an exemplary embodiment of this disclosure, among other possible things includes a first portion engageable to a case of the gas turbine engine. A second portion is configured for supporting a gear assembly. A torque reacting portion transfers torque from the second portion to the first portion. A forward flange is disposed forward of the torque reacting portion. The forward flange defines a first interface to the case. An aft flange is disposed aft of the torque reacting portion. The aft flange defines a second interface to the case. The forward flange and the aft flange include separately adjustable features for modifying the first interface and the second interface.

In a further embodiment of the foregoing gear assembly support, the forward flange includes a first diameter disposed forward of first portion the aft flange includes a second diameter aft of the first portion. The separately adjustable features include a first thickness between a forward undercut and the first diameter and a second thickness between an aft undercut and the second diameter.

In a further embodiment of any of the foregoing gear assembly supports, the first portion includes a spline engageable with features defined within the case of the engine.

In a further embodiment of any of the foregoing gear assembly supports, the forward undercut and the aft undercut are continuous about a circumference of the support.

In a further embodiment of any of the foregoing gear assembly supports, the torque reacting portion includes an axial width between the first portion and the second portion for defining torque transmitted to the case of the engine.

In a further embodiment of any of the foregoing gear assembly supports, includes a flex portion disposed between the second portion and the torque reacting portion.

In a further embodiment of any of the foregoing gear assembly supports, the forward flange includes an annular lip extending radially outward that fits within the case.

In a further embodiment of any of the foregoing gear assembly supports, includes a plurality of flanges extending axially forward of the first portion.

A turbofan engine according to an exemplary embodiment of this disclosure, among other possible things includes a fan including a plurality of fan blades rotatable about an engine axis, a turbine section; a geared architecture driven by the turbine section for rotating the fan about the engine axis, and a support member that supports the geared architecture. The support member includes a first portion engageable to a case of the turbofan engine, a second portion configured for supporting a gear assembly, a torque reacting portion for transferring torque from the second portion to the first portion, a forward flange disposed forward of the torque reacting portion, the forward flange defining a first interface to the case, and an aft flange disposed aft of the torque reacting portion. The aft flange defines a second interface to the case. The forward flange and the aft flange include separately adjustable features for adjusting the first interface and the second interface.

In a further embodiment of the foregoing turbofan engine, the forward flange includes a first diameter disposed forward of first portion the aft flange includes a second diameter aft of the first portion. The separately adjustable features include a first thickness between a forward undercut and the first diameter and a second thickness between an aft undercut and the second diameter.

In a further embodiment of any of the foregoing turbofan engines, the first portion includes a spline engageable with features defined within the case of the engine.

In a further embodiment of any of the foregoing turbofan engines, the forward undercut and the aft undercut are continuous about a circumference of the support.

In a further embodiment of any of the foregoing turbofan engines, the torque reacting portion includes an axial width between the first portion and the second portion for defining torque transmitted to the case of the engine.

In a further embodiment of any of the foregoing turbofan engines, includes a flex portion disposed between the second portion and the torque reacting portion.

In a further embodiment of any of the foregoing turbofan engines, the forward flange includes an annular lip extending radially outward that fits within the case.

A method of supporting a gear assembly within a gas turbine engine according to an exemplary embodiment of this disclosure, among other possible things includes defining a forward interface between a support member and a static structure within the gas turbine engine with a flange portion, defining an aft interface between the support member and the static structure, defining a torque transfer path between a first portion between the forward interface and the aft interface and a second portion configured for attachment to the gear assembly independent of the flange portion, attaching the gear assembly to the second portion, and attaching the support member to the static structure such that the flange portion positions the support member relative to the static structure.

In a further embodiment of the foregoing method, defining the fit between the support member and the static structure includes defining a thickness between at least one of a first diameter in the forward interface and a first undercut and a second diameter and a second undercut.

In a further embodiment of any of the foregoing methods, includes defining a plurality of undercuts, spacing the plurality of undercuts circumferentially apart and defining the torque transfer path at least partially between the plurality of undercuts.

In a further embodiment of any of the foregoing methods, defining the torque transfer path includes defining an axial thickness of the torque transfer path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
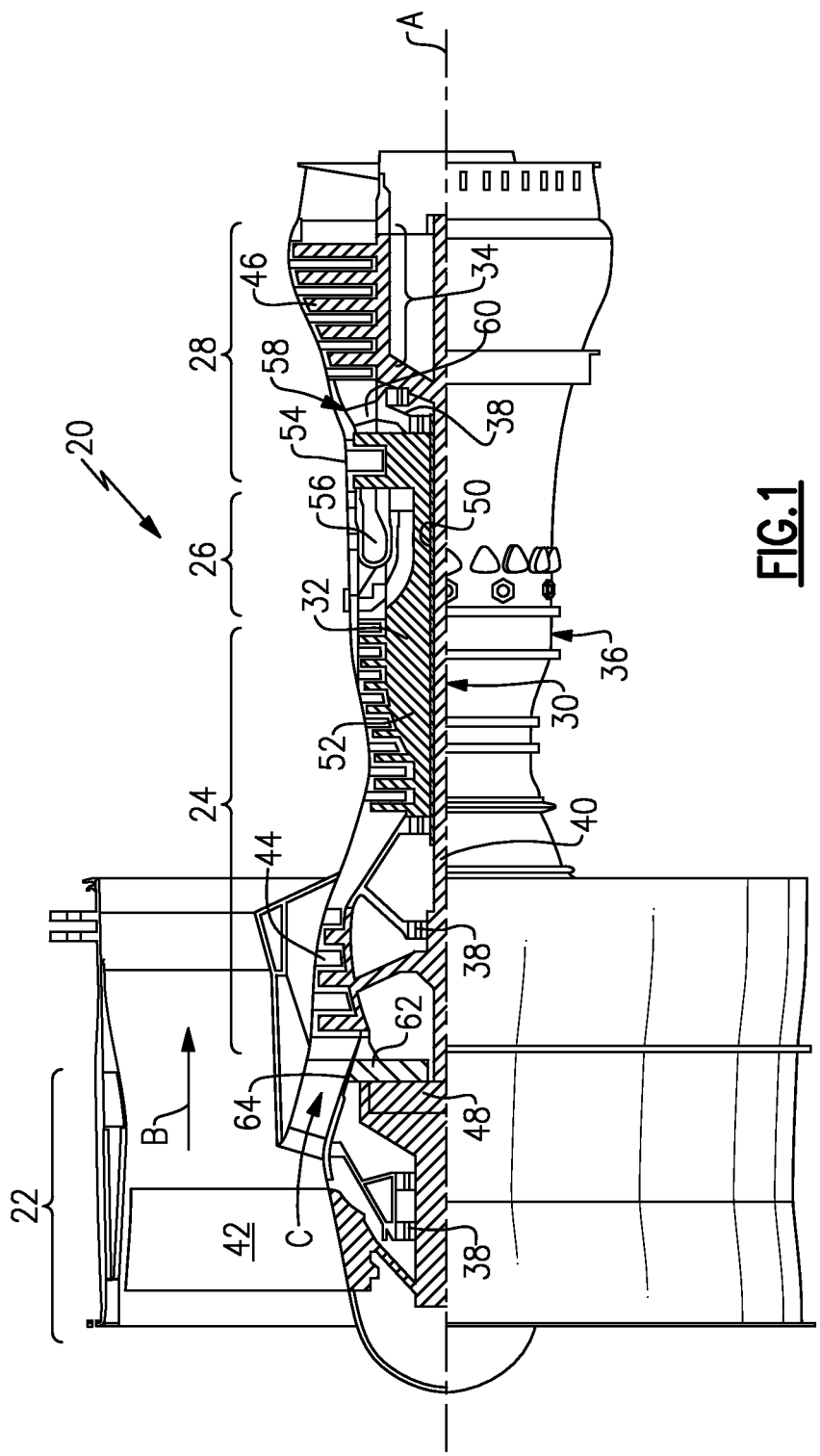
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A support member referred to in this disclosure as a flex support 62 is provided to mount the geared architecture 48 to a static structure or case 64 of the gas turbine engine 20. The flex support 62 supports the geared architecture 48 in a manner that provides flexibility to compensate for operational torque.

Figure 2:
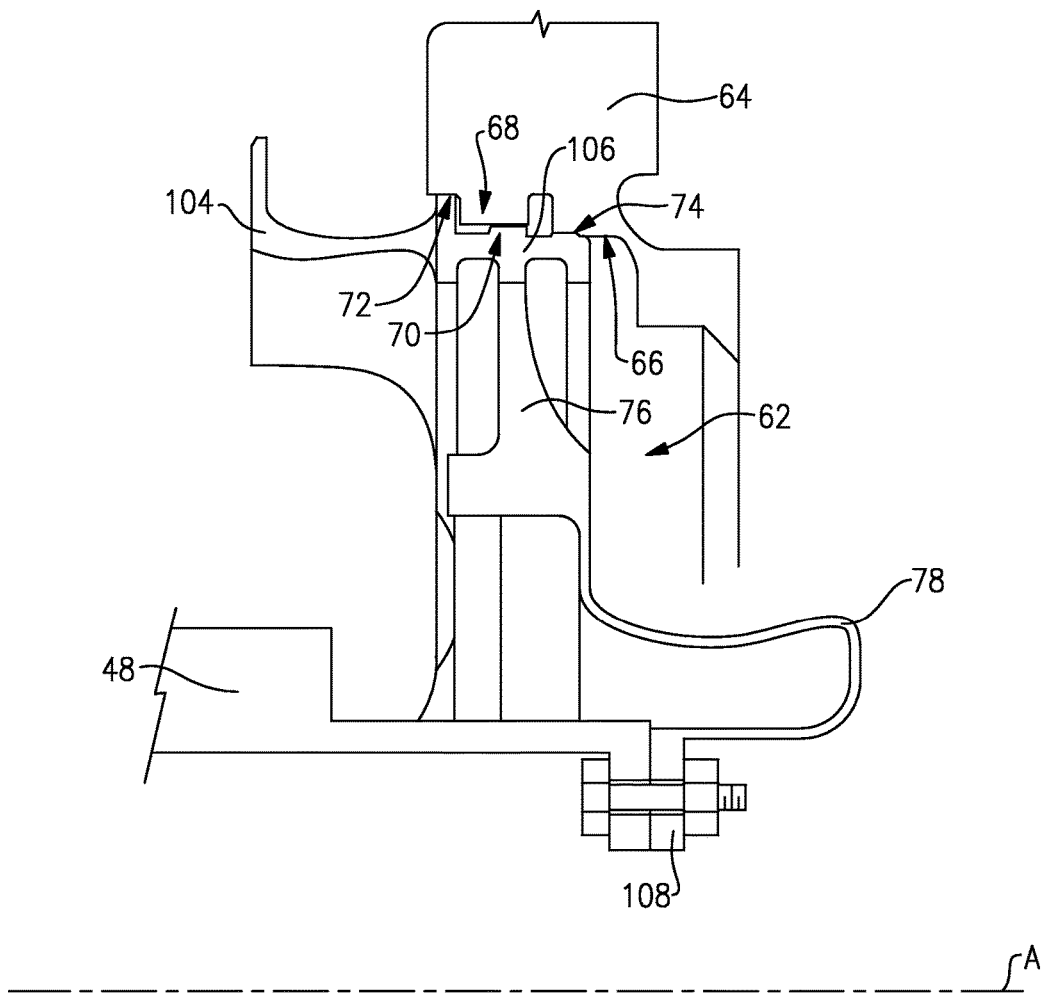
FIG. 2 is a sectional view of a portion of an example flex support for a geared architecture.

Referring to FIG. 2 with continued reference to FIG. 1, the example flex support 62 is fit within the case 64. The case 64 includes an inner surface 66 that includes a spline 68. The flex support 62 includes a first portion or mating spline 70 that engages the spline 68 of the case 64.

The flex support 62 includes a forward flange 72 disposed forward of the spline 70 and an aft flange 74 aft of the spline 70. The forward and aft flanges 72 and 74 define an interference fit sometimes referred to as a snap or snap fit. The forward flange 72 defines a first interface with the case 64 and the aft flange 74 defines a second interface with the case 64. The forward and aft flanges 72, 74 define interference fits between the flex support 62 and the case 64. The interference fit of the forward and aft flanges 72, 74 along with the spline 70 orientate the flex support 62 relative to the case 64. Flanges 104 extend forward and are attached to a portion of the case 64 to further secure the flex support 62 within the case 64. Orientation of the flex support 62 relative to the case 64 provides an orientation of the geared architecture 48 relative to the fixed case structure 64.

The flex support 62 grounds torque generated by the geared architecture 48 to the fixed case structure 64. The geared architecture 48 is attached to a thin-walled, contoured flexible portion 78. A thicker contoured portion is a torque reacting portion also referred to as a torque portion 76 transfers torque from the flex portion 78 radially outward through the spline 70 to the case 64.

Figure 3:
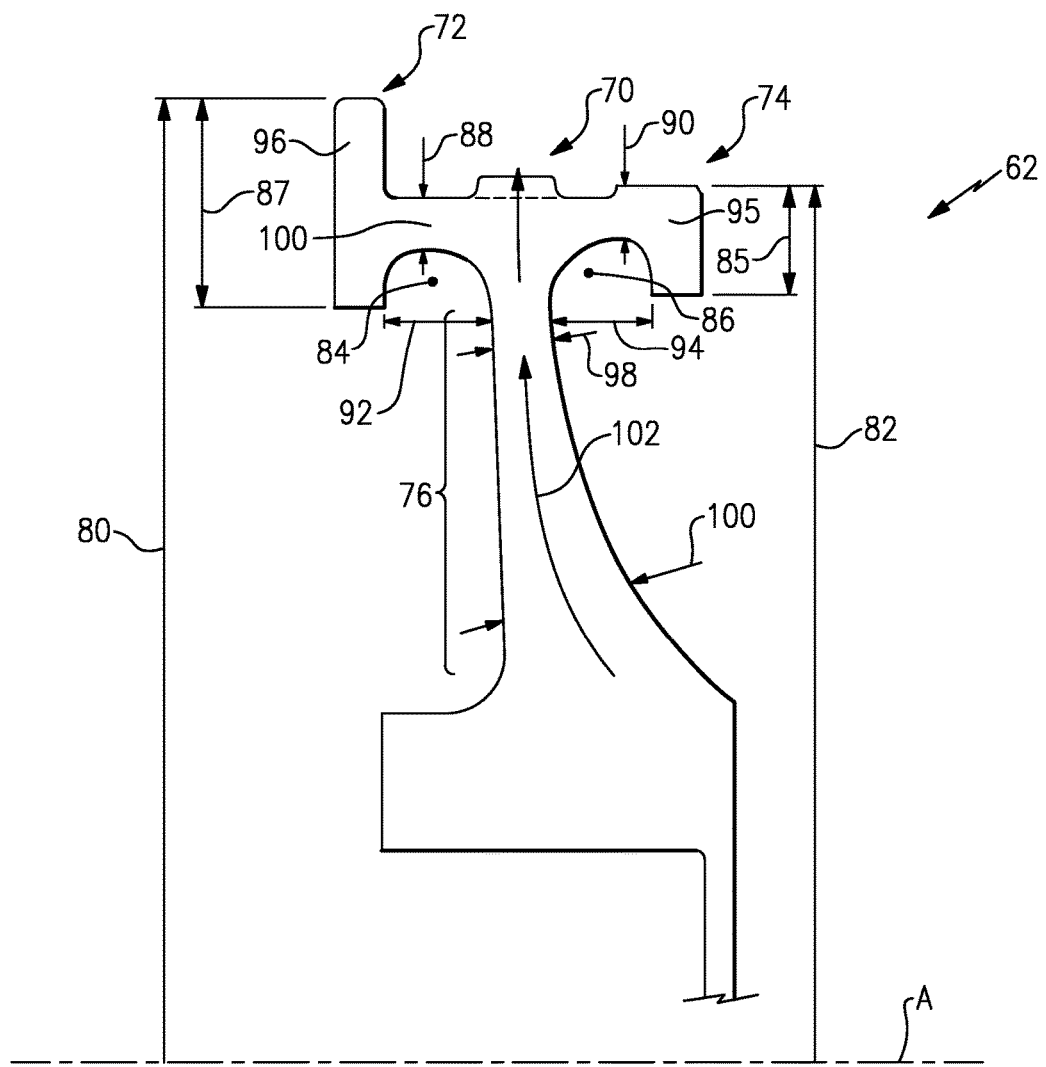
FIG. 3 is a cross-sectional view through a flange portion of the example flex support.
Figure 4:
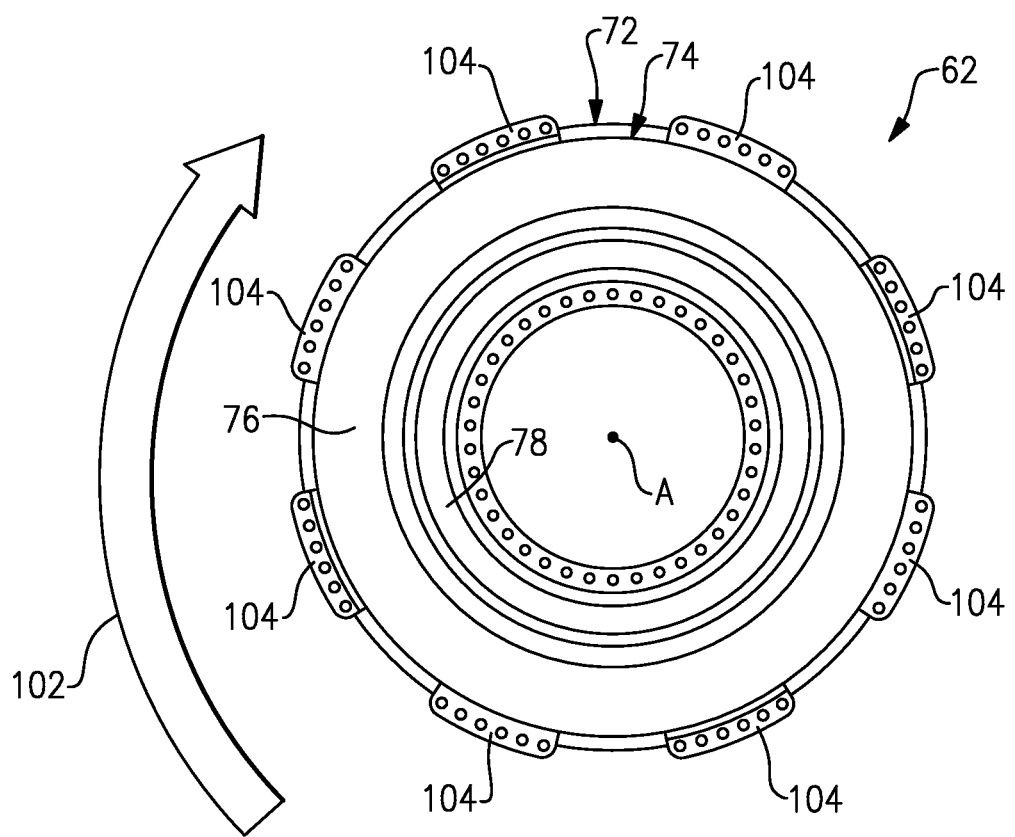
FIG. 4 is a front view of the example flex support.

Referring to FIGS. 3 and 4 with continued reference to FIG. 2, the flex support 62 grounds torque in a direction indicated by arrow 102 between the geared architecture 48 and the case 64. The torque encountered by the flex support 62 is communicated through the interface between the spline 70 of the flex support 62 and the spline 68 of the case 64.

The flex support 62 provides the desired interference fit with the case 64 by providing a desired interference fit at the forward and aft flanges 72, 74. The forward flange 72 is partially defined by a first diameter 80 and the aft flange 74 is partially defined by a second diameter 82. The forward flange 72 is further defined by a forward thickness 87 of a forward tab 96. The aft flange 74 is further defined by an aft thickness 85 of the aft tab 96.

The forward flange 72 includes a first thickness 88 having a forward undercut 84. The aft flange 74 similarly includes an aft undercut 86 having a second-aft thickness 90. Each of the forward and aft undercuts 84, 86 are continuous annular channels or grooves that extend along the inner diameter of the outer rim 106 of the flex support 62.

The first interference fit defined by the forward flange 72 is tailored by setting the first diameter 80 of the tab 96 and the forward thickness 87 of the forward tab 96 to provide the desired fit. The second interference fit is defined by the aft flange 74 by sizing the diameter 82 and the aft thickness 85 of the aft tab 95. The first thickness 88 of the forward undercut 84 along with an axial width 92 is adjusted to tailor the moment loading aspect of the flex support 62.

The second interference fit defined by the aft flange 74 is disposed at the second diameter 82 and defined by the aft thickness 85 of the aft tab 95. The size of the aft undercut 86 is formed by providing a desired thickness 90 and axial width 94. The size of the aft undercut 86 is utilized to tailor moment loading of the flex support 62.

The fit of the flex support 62 to the case 64 is tailored by defining the forward and aft thicknesses 87 and 85 of the forward and aft tabs 96, 95 along with the first and second outer diameters 80 and 82. Further adjustments to the flex support relating to moment loading are made by adjusting the size of the forward and aft undercuts 84 and 86.

Combinations of the aft thickness 85 of the aft tab 95 and the second diameter 82 provide for tailoring of the aft flange 74 independent of the forward flange 72 and of the torque portion 76.

In the illustrated example, the forward undercut 84 and the aft undercut 86 are similar in size and thickness, however, it is within the contemplation of this disclosure, that each of the forward and aft undercuts 84, 86 may be much different to separately and independently tailor the forward and aft flanges 72, 74 to meet application specific requirements. The first flange 72 is also adjustable independent and separate from aft flange 74 and torque portion 76.

Torque 102 is transferred between an inner flange 108 of the flex portion 78 to the outer rim 106 and the spline 70 through the torque portion 76. It should be understood, that the torque indicated by arrow 100 could be in an opposite direction and remain within the contemplation of this disclosure. The transmission of the torque 102 proceeds through the flex portion 78 and the torque portion 76 through the spline 70 to the spline 68 to be grounded to the case 64.

The example flex support 62 separates torque transmission from the forward and aft flange 72,74 such that each of the forward and aft flange 72, 74 and the torque portion 76 can be individually sized to accommodate application specific fitting requirements. Adjustment or tuning of the torque portion 76, to modify its vibration and flexure responsiveness, is provided by varying an axial thickness of material within the torque portion between the flex portion 78 and the outer rim 106. The torque portion 76 is a full annulus of material and transfers torque between flex portion 78 to the outer rim 106.

The example torque portion 76 includes a radially outer width 98 and a radially inner width 100. Both of the radially outer width 98 and the radially inner width 100 are in the axial direction with relative to the engine axis A. In this example the overall axial width decreases in a direction radially outward from the inner width 100 toward the outer width 98. This provides for the inner width 100 to be greater than the outer width 98. The decrease in width from the inner width 100 to the outer width 98 is a taper that provides a smooth transition between the inner and outer widths 100, 98.

Accordingly the example flex support 62 provides for the support of the geared architecture 48 and also for the separate adjustments of forward and aft flange fits 72, 74 between the case 64 that is independent of the torque path provided by the torque portion 76.

The separation of the flange fits from the torque portion 76 provides for the independent tailoring of material thicknesses through the flex support 62 to adjust the interference fit with the case 64 separately and independent of the material required to define a desired torque transmission path through the torque portion 76. The independent adjustment provides for a lighter and more economically robust flex support 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear assembly support for a gas turbine engine comprising:
   a first portion engageable to a case of the gas turbine engine;
   a second portion configured for supporting a gear assembly;
   a torque reacting portion for transferring torque from the second portion to the first portion;
   a forward flange disposed forward of the torque reacting portion, the forward flange defining a first interface to the case;
   a forward undercut defining a first thickness within a forward axial width between the torque reacting portion and the forward flange;
   an aft flange disposed aft of the torque reacting portion, the aft flange defining a second interface to the case; and
   an aft undercut defining an aft thickness within an aft axial width between the torque reacting portion and the aft flange.

2. The gear assembly support as recited in claim 1, wherein the forward flange and the aft flange include separately adjustable features for modifying the first interface and the second interface.

3. The gear assembly support as recited in claim 1, wherein the first portion comprises a spline engageable with features defined within the case of the engine.

4. The gear assembly support as recited in claim 1, wherein the torque reacting portion includes an axial width between the first portion and the second portion for defining torque transmitted to the case of the engine.

5. The gear assembly as recited in claim 1, including a flex portion disposed between the second portion and the torque reacting portion.

6. The gear assembly as recited in claim 1, wherein the forward flange comprises an annular lip extending radially outward that fits within the case.

7. The gear assembly as recited in claim 1, including a plurality of flanges extending axially forward of the first portion.

8. A gear assembly support for a gas turbine engine comprising:
   a first portion engageable to a case of the gas turbine engine;
   a second portion configured for supporting a gear assembly;
   a torque reacting portion for transferring torque from the second portion to the first portion;
   a forward flange disposed forward of the torque reacting portion, the forward flange defining a first interface to the case; and
   an aft flange disposed aft of the torque reacting portion, the aft flange defining a second interface to the case, wherein the forward flange and the aft flange include separately adjustable features for modifying the first interface and the second interface, the forward flange comprises a first diameter disposed forward of first portion, the aft flange comprises a second diameter aft of the first portion, wherein the separately adjustable features comprises a forward thickness of a forward tab under the first diameter and an aft thickness of an aft tab under the second diameter.

9. A turbofan engine comprising:
   a fan including a plurality of fan blades rotatable about an engine axis;
   a turbine section;
   a geared architecture driven by the turbine section for rotating the fan about the engine axis; and
   a support member that supports the geared architecture, the support member including a first portion engageable to a case of the turbofan engine, a second portion configured for supporting a gear assembly, a torque reacting portion for transferring torque from the second portion to the first portion, a forward flange disposed forward of the torque reacting portion, the forward flange defining a first interface to the case, and an aft flange disposed aft of the torque reacting portion, the aft flange defining a second interface to the case, a forward undercut defining a first thickness within a forward axial width between the torque reacting portion and the forward flange and an aft undercut defining an aft thickness within an aft axial width between the torque reacting portion and the aft flange.

10. The turbofan engine as recited in claim 9, wherein the forward flange and the aft flange include separately adjustable features for modifying the first interface and the second interface.

11. The turbofan engine as recited in claim 9, wherein the first portion comprises a spline engageable with features defined within the case of the engine.

12. The turbofan engine as recited in claim 9, including a forward undercut and an aft undercut that are continuous about a circumference of the support.

13. The turbofan engine as recited in claim 9, wherein the torque reacting portion includes an axial width between the first portion and the second portion for defining torque transmitted to the case of the engine.

14. The turbofan engine as recited in claim 9, including a flex portion disposed between the second portion and the torque reacting portion.

15. The turbofan engine as recited in claim 9, wherein the forward flange comprises an annular lip extending radially outward that fits within the case.

16. A turbofan engine comprising:
    a fan including a plurality of fan blades rotatable about an engine axis;
    a turbine section;
    a geared architecture driven by the turbine section for rotating the fan about the engine axis; and
    a support member that supports the geared architecture, the support member including a first portion engageable to a case of the turbofan engine, a second portion configured for supporting a gear assembly, a torque reacting portion for transferring torque from the second portion to the first portion, a forward flange disposed forward of the torque reacting portion, the forward flange defining a first interface to the case, and an aft flange disposed aft of the torque reacting portion, the aft flange defining a second interface to the case,
    wherein the forward flange and the aft flange include separately adjustable features for modifying the first interface and the second interface, wherein the forward flange comprises a first diameter disposed forward of first portion and the aft flange comprises a second diameter aft of the first portion, wherein the separately adjustable features comprises a forward thickness of a forward tab radially inward of the first diameter and an aft thickness of an aft tab radially inward of the second diameter.

17. A method of supporting a gear assembly within a gas turbine engine comprising:
    defining a forward interface between a support member and a static structure within the gas turbine engine with a flange portion;
    defining an aft interface between the support member and the static structure;
    defining a torque transfer path between a first portion between the forward interface and the aft interface and a second portion configured for attachment to the gear assembly independent of the flange portion;
    defining moment loading with a forward undercut defining a first thickness within a forward axial width between the torque reacting portion and the forward flange and an aft undercut defining an aft thickness within an aft axial width between the torque reacting portion and the all flange;
    attaching the gear assembly to the second portion; and
    attaching the support member to the static structure such that the flange portion positions the support member relative to the static structure.

18. The method as recited in claim 17, wherein defining the fit between the support member and the static structure comprises defining at least one of a forward thickness of a forward tab at a first diameter in the forward interface and an aft thickness of an aft tab of a second diameter.

19. The method as recited in claim 17, wherein defining the torque transfer path comprises defining an axial thickness of the torque transfer path.

\* \* \* \* \*